United States Patent
Duale et al.

(10) Patent No.: US 9,251,022 B2
(45) Date of Patent: *Feb. 2, 2016

(54) SYSTEM LEVEL ARCHITECTURE VERIFICATION FOR TRANSACTION EXECUTION IN A MULTI-PROCESSING ENVIRONMENT

(71) Applicant: International Business Machines Corporation, Armonk, NY (US)

(72) Inventors: Ali Y. Duale, Poughkeepsie, NY (US); Dennis W. Wittig, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/782,369

(22) Filed: Mar. 1, 2013

(65) Prior Publication Data

US 2014/0250329 A1      Sep. 4, 2014

(51) Int. Cl.
*G06F 11/26* (2006.01)
*G06F 11/07* (2006.01)
*G06F 9/30* (2006.01)
*G06F 11/36* (2006.01)

(52) U.S. Cl.
CPC ............ *G06F 11/26* (2013.01); *G06F 9/30145* (2013.01); *G06F 11/0778* (2013.01); *G06F 11/3684* (2013.01)

(58) Field of Classification Search
CPC ............ G06F 11/0751; G06F 11/1641; G06F 11/2236; G06F 15/7857; G06F 11/2273; G06F 11/263; G06F 12/084; G06F 13/1663; G06F 11/1004; G06F 11/0778; G06F 11/26

USPC ................................................ 714/35, 37
See application file for complete search history.

(56) References Cited

U.S. PATENT DOCUMENTS

| | | | |
|---|---|---|---|
| 4,354,227 A * | 10/1982 | Hays et al. | 710/240 |
| 5,233,611 A * | 8/1993 | Triantafyllos | G06F 11/3688 714/46 |
| 5,274,648 A * | 12/1993 | Eikill | G11C 29/28 714/50 |
| 5,333,297 A * | 7/1994 | Lemaire et al. | 710/200 |
| 5,438,673 A | 8/1995 | Court et al. | |
| 5,488,730 A * | 1/1996 | Brown et al. | 712/41 |
| 5,574,902 A | 11/1996 | Josten et al. | |
| 5,594,741 A | 1/1997 | Kinzelman et al. | |
| 5,845,130 A * | 12/1998 | Goff et al. | 710/240 |
| 5,905,855 A * | 5/1999 | Klaiber et al. | 714/31 |
| 6,285,974 B1 * | 9/2001 | Mandyam et al. | 703/13 |
| 6,567,934 B1 | 5/2003 | Yen et al. | |
| 6,629,281 B1 | 9/2003 | McNamara et al. | |

(Continued)

OTHER PUBLICATIONS

Harmanci, D., et al.; "Extendable Transactional Memory Testbed; Preprint submitted to Journal of Parallel and Distributed Computing"; p. 1-16; Sep. 30, 2009.

(Continued)

*Primary Examiner* — Loan L. T. Truong
(74) *Attorney, Agent, or Firm* — Cantor Colburn LLP; Steven Chiu

(57) ABSTRACT

Embodiments relate to building, by a computing device, a pseudo-random dynamic instruction stream that comprises instructions configured to perform a transaction execution. The computing device may cause the transaction execution to be tested in a multi-processing system based on the instruction stream. A status of the test may be output to one or more output devices.

12 Claims, 3 Drawing Sheets

(56) References Cited

U.S. PATENT DOCUMENTS

| | | | |
|---|---|---|---|
| 6,813,702 B1* | 11/2004 | Ramey et al. | 712/23 |
| 6,868,325 B2 | 3/2005 | Menon et al. | |
| 7,356,436 B2 | 4/2008 | Bohizic et al. | |
| 7,647,539 B2* | 1/2010 | Bussa et al. | 714/738 |
| 7,814,378 B2 | 10/2010 | Manovit et al. | |
| 7,818,646 B1 | 10/2010 | Maly et al. | |
| 7,877,742 B2 | 1/2011 | Duale et al. | |
| 7,979,743 B2* | 7/2011 | Garbow | 714/25 |
| 8,020,037 B1 | 9/2011 | Schwartz et al. | |
| 8,060,727 B2* | 11/2011 | Blixt | 712/32 |
| 8,191,046 B2* | 5/2012 | Dern et al. | 717/124 |
| 8,832,020 B2 | 9/2014 | Landy et al. | |
| 8,837,211 B2 | 9/2014 | Jurasek | |
| 8,898,652 B2 | 11/2014 | Gray et al. | |
| 9,037,812 B2 | 5/2015 | Chew | |
| 2002/0100024 A1* | 7/2002 | Hunter | G06F 11/364 717/129 |
| 2004/0034741 A1* | 2/2004 | Buzby | G06F 12/084 711/130 |
| 2004/0093536 A1* | 5/2004 | Weller | G06F 11/263 714/33 |
| 2005/0223274 A1 | 10/2005 | Bernick et al. | |
| 2006/0020852 A1* | 1/2006 | Bernick et al. | 714/11 |
| 2006/0080523 A1* | 4/2006 | Cepulis | 713/100 |
| 2006/0179275 A1* | 8/2006 | Yamazaki | 712/205 |
| 2006/0259705 A1* | 11/2006 | Cousin et al. | 711/144 |
| 2007/0168808 A1* | 7/2007 | Ong | G01R 31/31922 714/731 |
| 2007/0288189 A1* | 12/2007 | Mishuku | 702/117 |
| 2008/0288834 A1* | 11/2008 | Manovit et al. | 714/718 |
| 2010/0205378 A1* | 8/2010 | Moyer | 711/146 |
| 2011/0131452 A1 | 6/2011 | Kumar et al. | |
| 2012/0226942 A1 | 9/2012 | Gangasani et al. | |
| 2013/0238934 A1* | 9/2013 | Kadowaki | G06F 11/2294 714/31 |
| 2013/0318400 A1 | 11/2013 | Liang et al. | |
| 2013/0339327 A1 | 12/2013 | Belmar et al. | |
| 2014/0250330 A1* | 9/2014 | Duale et al. | 714/37 |

OTHER PUBLICATIONS

Liu, Y., et al.; "Toxic Transactions"; 6th ACM SIGPLAN Workshop on Transactional Computing, Transact; p. 1-9; 2011.

Manovit, C.; "Testing Memory Consistency of Shared-Memory Multiprocessors"; Dissertation; Stanford University; p. 1-122; Jun. 2006.

Sosnowski, J.; "Software-Based Self-Testing of Microprocessors"; Journal of Systems Architecture; p. 1-15; 2005.

z/Architecture: "Principles of Operation"; Tenth Edition, Sep., 2012; Publication No. SA22-7832-09; copyright IBM Corp.; 1990-2012; p. 1-1568.

* cited by examiner

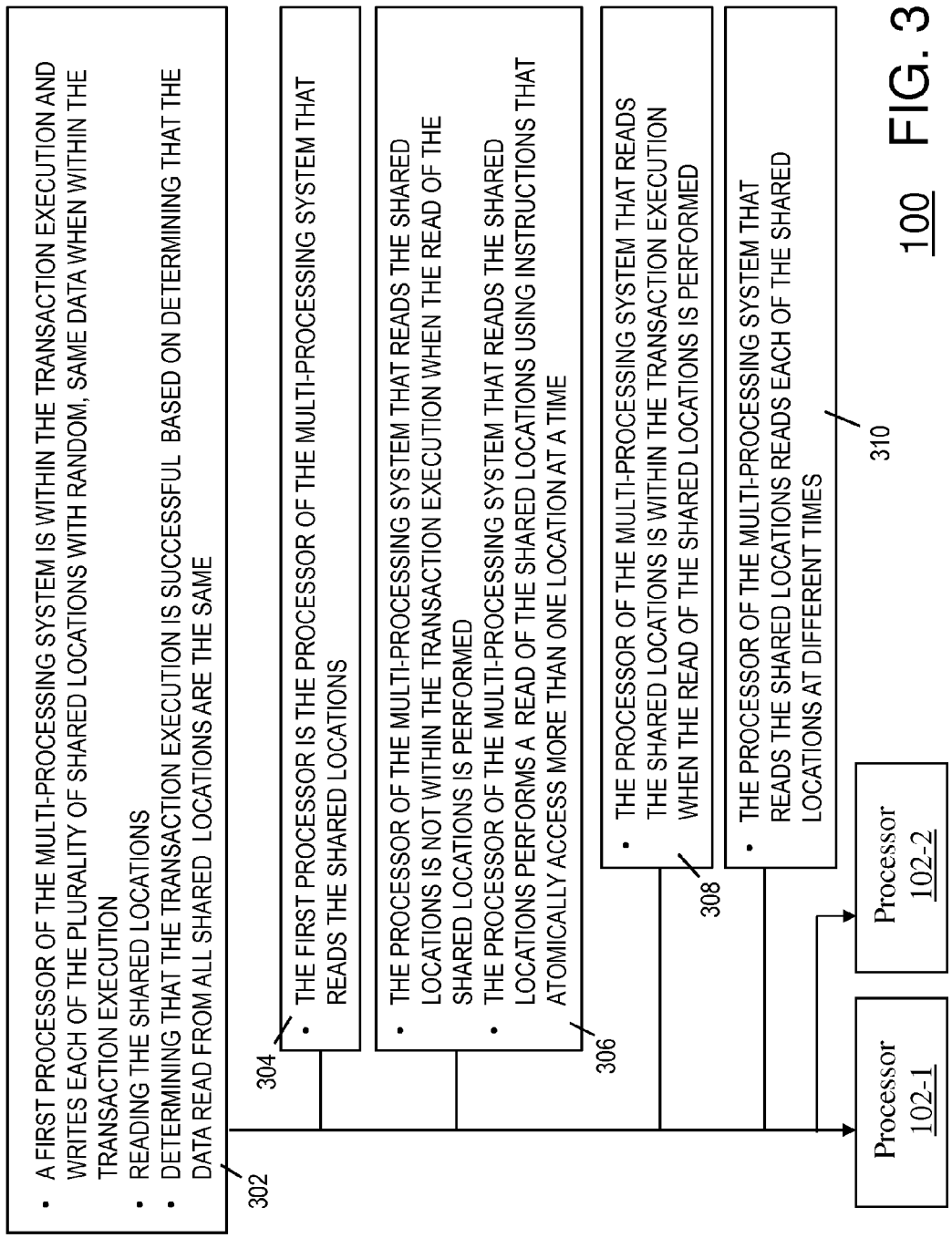

SYSTEM LEVEL ARCHITECTURE VERIFICATION FOR TRANSACTION EXECUTION IN A MULTI-PROCESSING ENVIRONMENT

BACKGROUND

The present invention relates generally to computer technology, and more specifically to transaction execution functionality.

A transaction may begin and end with one or more machine instructions. For example, a transaction may begin with a TBEGIN instruction and end with a TEND instruction. If a transaction cannot be completed the transaction may be aborted.

A transaction execution (TX) function may provide atomic store and fetch access to/from multiple storage locations using a majority of an instruction set. In a computing environment (e.g., a multi-processing environment), two or more processors may access a resource (e.g., a cache line) at a given point in time. At least one of the processors may be operative with respect to a TX.

BRIEF SUMMARY

An embodiment is directed to a method comprising building, by a computing device, a pseudo-random dynamic instruction stream that comprises instructions configured to perform a transaction execution. The method comprises testing, by the computing device, the transaction execution in a multi-processing system based on the instruction stream. The method comprises outputting, by the computing device, a status of the test to one or more output devices.

An embodiment is directed to a computer program product comprising: a computer readable storage medium having program code embodied therewith. The program code is executable by a processing device to build a pseudo-random dynamic instruction stream that comprises instructions configured to perform a transaction execution. The program code is executable by the processing device to test the transaction execution in a multi-processing system based on the instruction stream. The program code is executable by the processing device to output a status of the test to one or more output devices.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates an abbreviated version of the computing system in accordance with one or more embodiments.

DETAILED DESCRIPTION

Embodiments described herein are directed to pseudo-random and dynamic test case generation at a system level for transactional execution (TX). The creation of test cases may include one or more of: (1) building transactions with different levels of nesting, (2) re-driving or re-initiating an aborted transaction a number of times in an attempt to achieve successful completion of the transaction, (3) incorporating built-in random waits to burn cycles to mitigate worst-case scenarios where two or more processors keep contending or fighting for a given resource (e.g., a cache line) and, as a result, keep causing aborts, (4) assuring that storage and registers are restored when aborts happen as required by the architecture, (5) creating test environments where two or more processors share a given resource (e.g., cache lines) and, therefore, potentially cause aborts based on a conflict, (6) assuring two or more processors access (e.g., read and/or write) from the same locations while at least one of them is within TX, and (7) assuring that if there are no aborts, or aborts are resolved by repeating the test case, all the updates and results performed in while in the transaction appear as if they were processed atomically regardless the number of processors that attempted to accesses the common resources.

Figure 1:
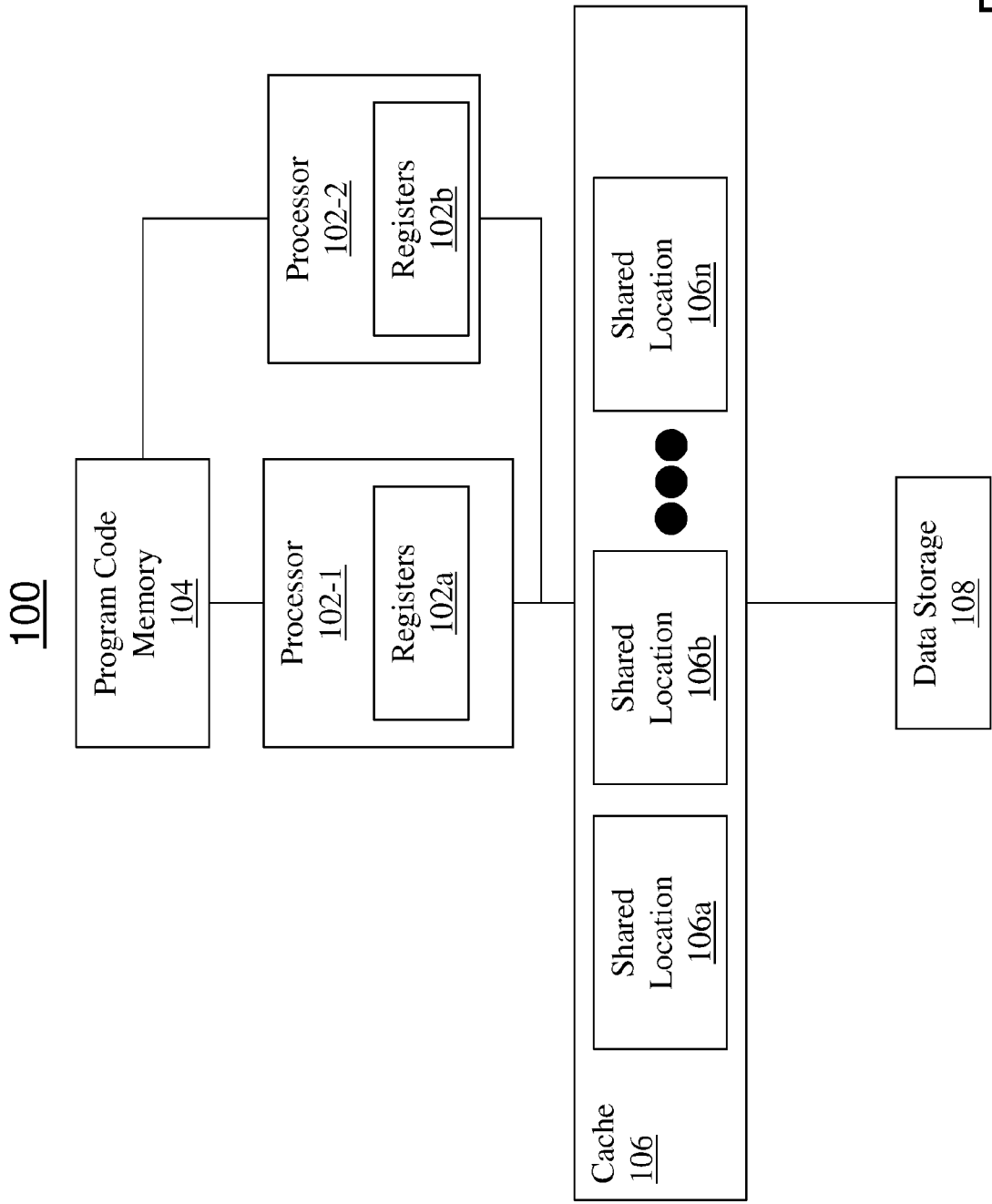
FIG. 1 illustrates a computing system in accordance with one or more embodiments.

Turning now to FIG. 1, a computing system 100 in accordance with one or more embodiments is shown. The system 100 may include one or more processors, such as processors 102-1 and 102-2. The processors 102-1 and 102-2 may include one or more components or devices. For example, the processor 102-1 is shown as including one or more registers 102a and the processor 102-2 is shown as including one or more registers 102b. The registers 102a and 102b may be of one or more types, such as general purpose registers, floating point registers, etc.

The processor 102-1 and the processor 102-2 may execute one or more instructions. The instructions may be associated with program code and may be organized at any level of computing abstraction. For example, the instructions may be organized as one or more algorithms, routines, functions, tasks, etc. The program code may be stored in one or more memory devices, such as a program code memory device 104. While the processor 102-1 and the processor 102-2 are shown in FIG. 1 as sharing the program code memory 104, in some embodiments each of the processors 102-1 and 102-2 may have its own dedicated program code memory.

The processor 102-1 and the processor 102-2 may be operative on data. Data may be loaded from memory and stored to the memory. In this regard, the system 100 is shown as including two levels of data memory. A first level cache 106 may be used to store those items of data that are frequently or recently accessed by the processor 102-1 and/or 102-2. A second level of data memory, indicated as a data storage 108 in FIG. 1, may be used to store those items of data that are less frequently or less recently accessed by the processor 102-1 and/or the processor 102-2. In some embodiments, more or less than two levels of data storage may be used. In some embodiments, the program code memory 104 may be at least partially combined with one or more of the cache 106 and the data storage 108.

In some embodiments, the cache 106 may include a number n of shared locations, denoted in FIG. 1 as 106a, 106b, . . . 106n. The potential role and use of the shared locations 106a-106n is described in further detail below.

The computing system 100 is illustrative. In some embodiments, one or more of the devices or components shown in FIG. 1 may be optional. In some embodiments, additional components or devices that are not shown may be included. In some embodiments, the components/devices of FIG. 1 may be organized or arranged in a manner that is different from what is shown.

As described above, test cases may be generated at a system level for transactional execution (TX). Transaction execution is described in International Business Machines, "z/Architecture Principles of Operation", SA22-7832-08, tenth edition (September 2012), the contents of which are incorporated by reference.

A transaction may be aborted either implicitly or explicitly. For example, execution of a TABORT instruction may cause a transaction to abort in an explicit manner. A transaction may be implicitly aborted if, e.g., (1) an exception or interrupt is recognized while in the transaction, (2) where transactions are nested a transaction nesting level threshold is exceeded, (3) a number of storage accesses within a transaction exceeds a threshold, (4) two or more processors access a resource (e.g., a cache line) while either one of them is in TX and either one of them attempts to store into that resource (e.g., store or fetch conflict), (5) a restricted instruction is attempted within the transaction.

In some embodiments, when a processor (e.g., processor 102-1 and/or processor 102-2 of FIG. 1) does not make forward progress (e.g., a transaction that aborts continues to abort even after a number of retries, where the retries may be associated with a random delay), a determination may be made regarding the actual or likely cause of the abort. If a user elects to tolerate the abort, operation may continue in spite of the abort. Otherwise, an error condition may be set or flagged.

In some embodiments, test cases may be built that create combinations of different access types using all possible instructions within transactions. A detection and handling of aborts (e.g., explicit and implicit aborts) according to the architecture may be provided. For example, in some instances storage and/or registers may be reset to a state just prior to a transaction in response to an abort. In some instances, registers and/or storage that is/are updated during a transaction might not be reset despite an occurrence of an abort. An example of storage operations that would not need to be reset would be non-transactional stores. The frequency of non-transactional stores may be controlled to facilitate debugging activities.

Figure 2:
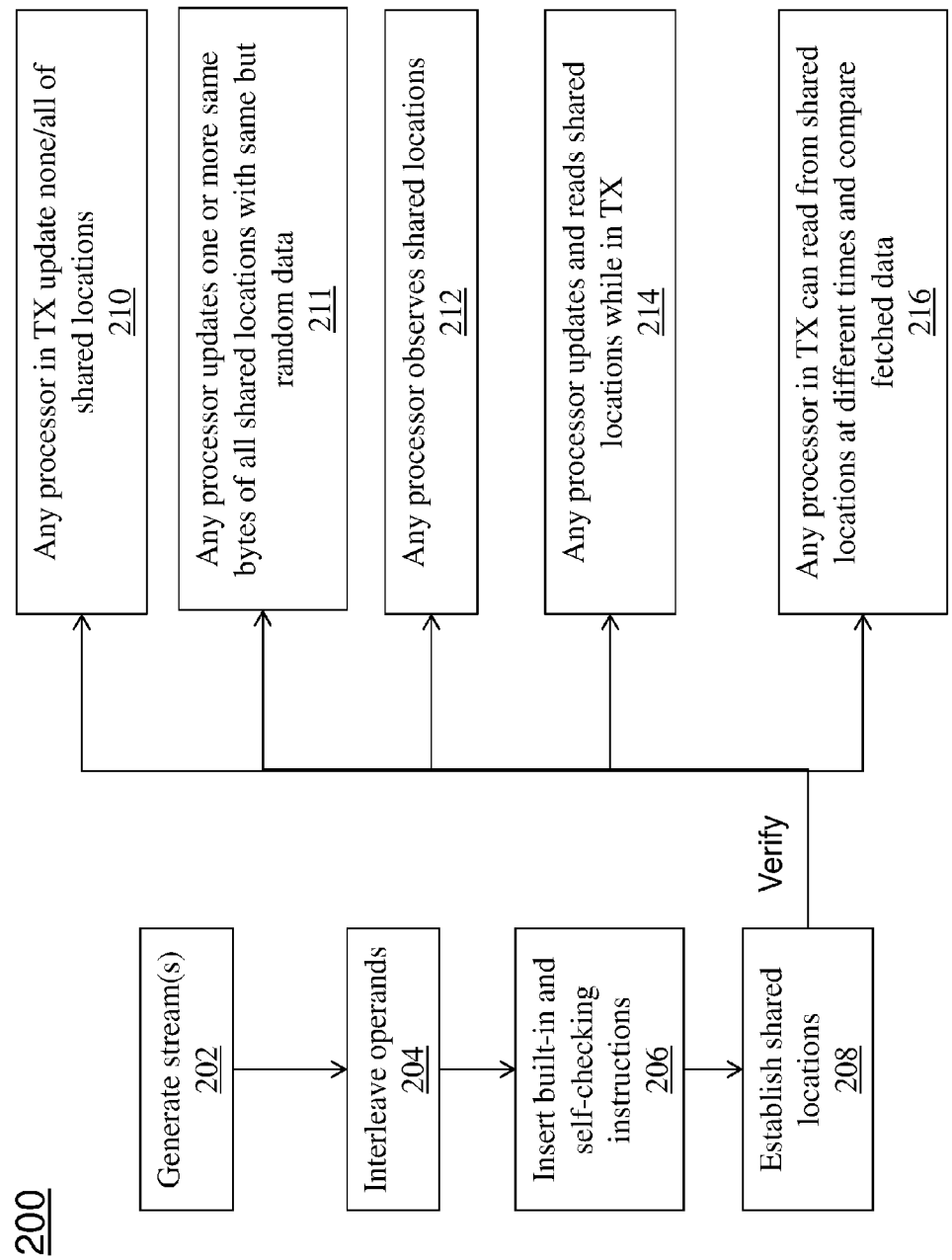
FIG. 2 illustrates a flow chart of an exemplary method in accordance with one or more embodiments.

Turning now to FIG. 2, a flow chart of an exemplary method 200 is shown. The method 200 may execute in connection with one or more components or devices, such as those shown and described in connection with the system 100 of FIG. 1. The method 200 may be used to build one or more test cases.

In block 202, one or more instruction streams may be generated (e.g., randomly generated). The stream(s) may be configured to initiate TX on one or more processors (e.g., processor 102-1 and/or processor 102-2) within a computing configuration or environment (e.g., system 100). An instruction stream may be a pseudo-random dynamic instruction stream. In this respect, the instruction stream may include variable or different instructions at different points in time, such that a complete instruction set architecture may be supported.

In block 204, the operands of one or more processors may be interleaved to create contention. Execution of the block 204 may create opportunities of causing aborts due to a resource conflict, such as a cache conflict.

In block 206, built-in and self-checking instructions may be inserted to monitor the occurrences of aborts. The instructions may direct a processor to retry a transaction a number of times if the abort is deemed to be due to, e.g., cache (e.g., cache 106) related issue(s). The processor may be allowed to retry the transaction after a random time elapses. The random time may be used as a back-off to reduce the likelihood or probability that two or more processors attempt to access the same resource (e.g., a cache line) while at least one of the processors is within TX. In the event that further progress is not possible (e.g., the TX keeps aborting despite a potential retry), an error flag may be set. When an abort is detected, an indication of the abort may be provided to one or more output devices (e.g., one or more display devices).

In block 208, a number of shared locations (e.g., shared locations 106a-106n) may be built or established where any processor that is in TX can write into and read from. In some embodiments, processors that are not in the transaction may also read from these shared locations.

A coherence of the shared locations of block 208 may be verified in a number of ways. For example, the verification may include one or more of the blocks 210-216 described below.

Block 210: any processor that is in the TX may update none or all of the shared locations. If a processor is updating a shared location, the processor may place random, common data in each of the shared locations. If the data is the same in all of the shared locations, it may be assumed that no violation has occurred. Otherwise, if the data is not the same in all of the shared locations, two or more processors may be updating the locations concurrently and implementation of the TX may have violated the architecture.

Block 211: any processor may update one or more same bytes of all shared locations with the same but random data. At the end, the shared locations should all contain same data though updates may be due to one or more processors.

Block 212: any processor, regardless of whether the processor is in TX, may observed the shared locations using, e.g., instructions that can atomically access more than one location at a time. Such a processor can further assure that it read the same data since each processor was placing unique but random data in all the shared locations.

Block 214: any processor can update and read the same shared locations while in the transaction. A processor may only read back what it placed in the shared locations since two (or more) processors cannot alter these shared locations while either one of them is in TX.

Block 216: a processor in TX can read from the shared locations at different times and later compare fetched data. Such data has to be identical since no other processor could update these locations between the fetches.

In some embodiments, the results or a status of the verification or test may be output to one or more output devices.

FIG. 3 illustrates an abbreviated version of the computing system 100 in accordance with one or more embodiments. For simplicity, other components/devices in the computing system 100 have been omitted. FIG. 3 shows blocks 302, 304, 306 308, and 310 as processes that may be executed by the processor 102-1 and/or the processor 102-2 as understood by one skilled in the art.

Technical effects and benefits include an ability to test transactional execution functionality. Embodiments of the disclosure provide for pseudo-random instruction and dynamic instruction streams that may be applied at a unit or system level. For example, a test may be applied to a transaction execution in a multi-processing system based on one or more instruction streams. Overall machine state in reaction to transactional execution (e.g., start, stop and abort) may be properly handled. For example, at least part of a machine state may be reset in response to an abort. Shared locations may be used to determine whether a transaction is successfully performed. If an abort occurs, re-execution of a test case may be undertaken if the likelihood or probability of success is greater than a threshold. Tolerance for persistent aborts may be provided, potentially based on one or more inputs (e.g., user inputs).

The terminology used herein is for the purpose of describing particular embodiments only and is not intended to be limiting of the invention. As used herein, the singular forms "a", "an" and "the" are intended to include the plural forms as well, unless the context clearly indicates otherwise. It is further understood that terms 'cache' and 'cache-line' are intended to simply exemplify storage. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
building, by a computing device, a pseudo-random dynamic instruction stream that comprises instructions configured to perform a transaction execution;
testing, by the computing device, the transaction execution in a multi-processing system based on the instruction stream;
outputting, by the computing device, a status of the test to one or more output devices;
wherein a first processor of the multi-processing system is within the transaction execution and writes each of the plurality of shared locations with random, same data when within the transaction execution;
reading the shared locations; and
determining that the transaction execution is successful based on determining that the data read from all shared locations are the same.

2. The method of claim 1, further comprising:
interleaving operands of at least two processors of the multi-processing system to create contention with respect to a resource.

3. The method of claim 2, wherein the resource comprises a cache accessed by the at least two processors, and wherein the contention is created with respect to a cache line of the cache.

4. The method of claim 1, further comprising:
inserting built-in and self-checking instructions into the instruction stream to monitor for an occurrence of one or more aborts in the transaction execution; and
causing an indication of the one or more aborts to be provided on an output device.

5. The method of claim 1, further comprising:
retrying, by at least one processor of the multi-processing system, the transaction execution after a random time elapses in response to an abort.

6. The method of claim 1, further comprising:
establishing, by the computing device, a plurality of shared locations to serve as a basis for determining whether the transaction execution is successful.

7. A computer program product comprising:
a non-transitory computer readable storage medium having program code embodied therewith, the program code executable by a processing device to:
build a pseudo-random dynamic instruction stream that comprises instructions configured to perform a transaction execution;
test the transaction execution in a multi-processing system based on the instruction stream;
output a status of the test to one or more output devices; and
establish a plurality of shared locations in a cache to serve as a basis for determining whether the transaction execution is successful;
wherein a first processor of the multi-processing system is within the transaction execution and writes each of the plurality of shared locations with random, same data when within the transaction execution.

8. The computer program product of claim 7, wherein a processor of the multi-processing system reads the shared locations and determines that the transaction execution is successful when the data read from all shared locations are the same.

9. The computer program product of claim 8, wherein the first processor is the processor of the multi-processing system that reads the shared locations.

10. The computer program product of claim 8, wherein the processor of the multi-processing system that reads the shared locations is not within the transaction execution when the read of the shared locations is performed, and wherein the processor of the multi-processing system that reads the shared locations performs a read of the shared locations using instructions that atomically access more than one location at a time.

11. The computer program product of claim 8, wherein the processor of the multi-processing system that reads the shared locations is within the transaction execution when the read of the shared locations is performed.

12. The computer program product of claim 11, wherein the processor of the multi-processing system that reads the shared locations reads each of the shared locations at different times.

* * * * *